(12) United States Patent
Lau et al.

(10) Patent No.: US 6,463,478 B1
(45) Date of Patent: Oct. 8, 2002

(54) METHOD AND APPARATUS FOR IDENTIFYING RUNT DATA FRAMES RECEIVED BY A NETWORK SWITCH

(75) Inventors: Michael Vengchong Lau, Cupertino; Charlie Sang, Fremont, both of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/316,179

(22) Filed: May 21, 1999

(51) Int. Cl.[7] ............................................. G06F 11/28
(52) U.S. Cl. ................................... 709/236; 709/224
(58) Field of Search .................. 365/230.05; 370/230, 370/236, 252; 709/224, 230, 236, 252

(56) References Cited

U.S. PATENT DOCUMENTS

| | | | |
|---|---|---|---|
| 4,679,193 A | * 7/1987 | Jensen et al. | 370/230 |
| 5,493,562 A | * 2/1996 | Lo | 370/252 |
| 5,515,376 A | 5/1996 | Murthy et al. | 370/402 |
| 5,594,702 A | * 1/1997 | Wakeman et al. | 365/230.05 |
| 5,664,105 A | * 9/1997 | Keisling et al. | 709/224 |
| 5,778,175 A | * 7/1998 | Paul et al. | 709/250 |
| 6,108,713 A | * 8/2000 | Sambamurmthy et al. | 709/250 |
| 6,195,334 B1 | * 2/2001 | Kadambi et al. | 370/236 |

* cited by examiner

Primary Examiner—N. Le
Assistant Examiner—Walter Benson

(57) ABSTRACT

An apparatus and method for detecting runt data frames received by a network switch includes a plurality of queuing logics, corresponding to the number of ports contained in the network switch. The queuing logics transfer received data frames to a memory area of the network switch. The queuing logics also update the value of a column write pointer that indicates the number of data transfers required to store a prescribed portion of a particular received data frame in the memory area. A rules queue examines the column write pointer and determines if the particular data frame is a runt data frame. A runt indication signal is generated, after the particular data frame has been completely transferred to the memory area, in order to indicate if the particular data frame was a runt data frame.

27 Claims, 10 Drawing Sheets

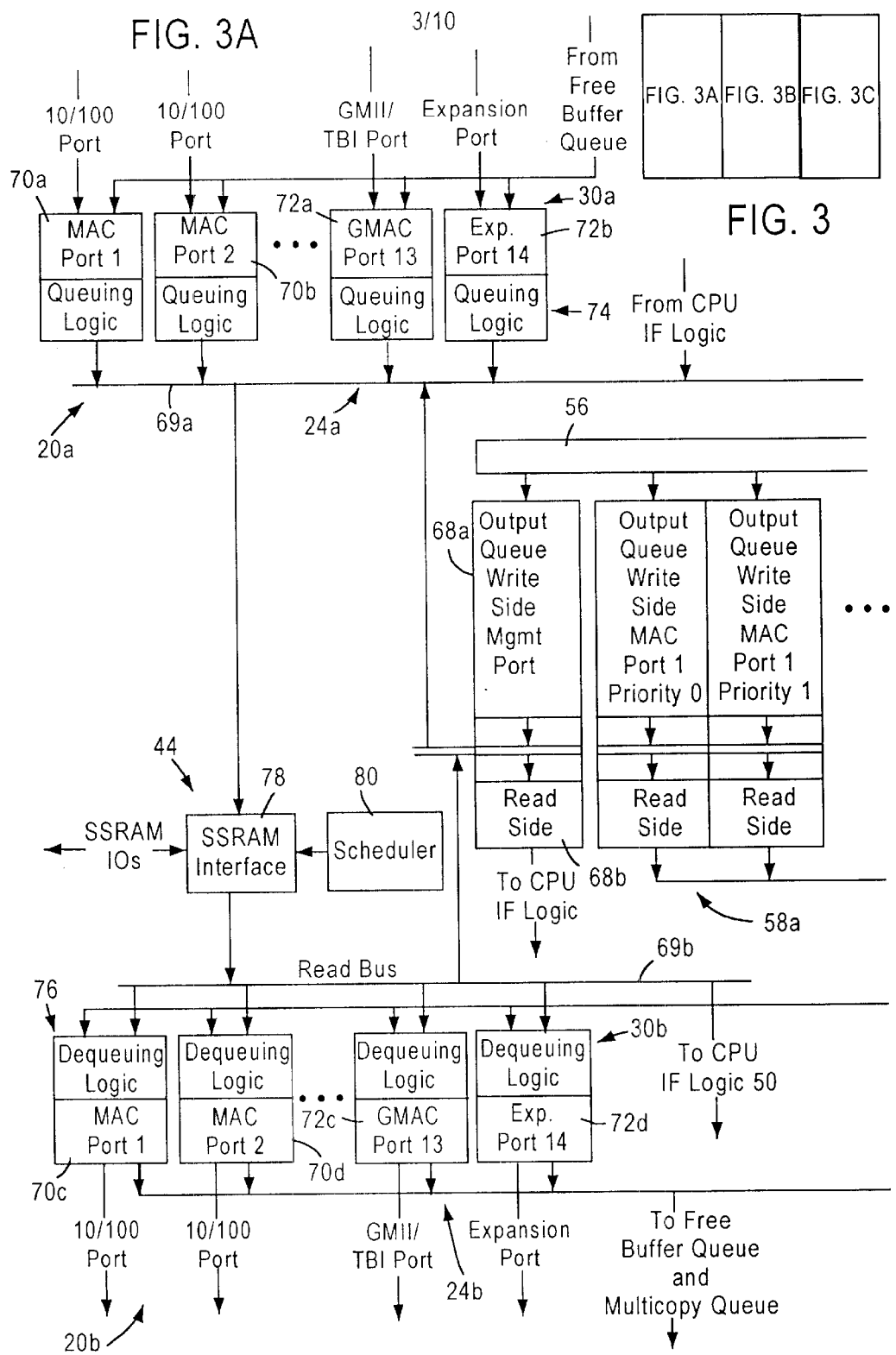

METHOD AND APPARATUS FOR IDENTIFYING RUNT DATA FRAMES RECEIVED BY A NETWORK SWITCH

BACKGROUND OF THE INVENTION

1. Field of the Invention

The present invention relates to communication systems, and more particularly, to a method and apparatus for selectively controlling the flow of data between plural network stations.

2. Description of the Related Art

Modern communication systems, such as computer networking systems or communication networks, provide constant transmission of data between end stations and/or intermediate stations such as routers and signal amplifiers. Computer networking systems, such as packet switched networks (e.g., Ethernet networks), often require transmission of data to a single end station or to multiple end stations within the network. The data originates from a user program, and is segmented into multiple data frames and subsequently transmitted in order to simplify processing and minimize the retransmission time required for error recovery. For example, in a conventional e-mail system, a user may desire to send the same e-mail message to four different users that are connected to the e-mail system. Accordingly, the identical data would be directed to multiple end stations.

Packet switched computer networks typically employ a network switch that receives and forwards data frames to individual and/or multiple end stations. The switch makes forwarding decisions upon receipt of data frames based on information contained in a header of each data frame. For example, if a received data frame is to be transmitted to a number of end stations, the switch must make the forwarding decision to forward the data frame to the ports of the correct end stations.

Data frames must comply with certain transmission standards such as, for example, the Ethernet (IEEE 802.3) network standard, that allow transparent interpretation by various network systems. The network standard outlines the parameters and requirements (e.g., media type, data structures, etc.) that must be used to ensure prescribed levels of reliability and quality of service. During normal operation, a large quantity of data must be exchanged though a network. For various reasons, however, some of the data will not reach its destination. For example, computer networking protocols require that data be segmented into sub-units, such as data frames, that conform to prescribed specifications. The data frames are transmitted from a source station and reassembled by a destination station upon receipt of all the segments. Oftentimes, individual segments are lost or damaged during transit. This may be the result of line noise or other factors that function to corrupt the data. In order to anticipate and compensate for such occurrences, computer networks implement error correction protocols capable of requesting retransmission of individual data frames that have been lost or damaged in transit. When properly supported and implemented between two network stations, most transmission errors can be corrected.

When data frames are received by a network switch, they are forwarded by the network switch to a network station specified by a header contained in each data frame. Data frames received by the network stations must then be reassembled into the original data that was segmented by the source station. Prior to reassembly, a network station examines each data frame to ensure that no errors have occurred and that each data frame conforms to the standards specified by the protocol being used. During operation, the network switch and network station must also identify various properties of each data frame in order to provide efficient and reliable service.

One such property normally identified by the network switch is a "runt" status. As used herein, a data frame having a runt status (i.e., a runt data frame) is defined as a data frame that is less than a specified size. Oftentimes, data frames that are less than a specified size contain errors. The specified size may be determined and set in advance, or dynamically changed during normal operation of the network system. It is normally difficult to identify properties such as a runt status because the criteria that define a runt data frame are not standard parameters, and therefore can vary between and within a large network, such as a Wide Area Network (WAN), that includes multiple network switches. Furthermore, runt data frames do not necessarily contain any errors. For example, runt data frames may be identified in order to minimize operations that can only be performed on data frames that are at least equal to the specified size. In situations where properties such as a runt status are identifiable, a significant amount of logic and time is required to process each data frame.

For example, one approach to detecting the runt status of data frames received by a network switch employs specialized logic for each port supported by the network switch. Accordingly, each port must independently identify runt data frames. In addition, a direct path must be created between each port (i.e., the logic used to detect runt status) and the entity responsible for making decisions for the network switch based on the runt status. On network switches that are embodied in a single chip, the additional logic and data paths must be added at the expense of on-chip real estate.

Accordingly, a problem associated with communication systems, such as computer networks, is the difficulty encountered in detecting certain characteristic properties of data frames, such as a runt status. Another problem associated with communication systems is the cost associated with implementing circuitry to determine such characteristic properties.

DISCLOSURE OF THE INVENTION

There exists a need for an arrangement that is capable of efficiently identifying particular characteristics of data frames within a communication system such as a computer network. These and other needs are addressed by the present invention wherein the number of data transfers required to store a prescribed portion of a received data frame is examined in order to determine if the received data frame is a runt data frame.

In accordance with one aspect of the present invention, a method of detecting whether data frames received by a network switch are runt data frames comprises the steps: examining a stored value that indicates the number of data transfers required to store a prescribed portion of the received data frame in a memory area of the network switch; determining if the received data frame is a runt data frame based on the stored value; and generating a runt indication signal upon completion of transfer of the received data frame to the memory area, the runt indication signal specifying whether the received data frame is a runt data frame. The present method eliminates the need to incorporate complicated logic to detect runt data frames by examining a stored value which is normally used to track the number of data transfers to the memory area. The amount of time required to identify received data frames is also reduced because the additional processing normally required to identify which data frame is a runt data frame is minimized.

According to another aspect of the invention, an arrangement is provided for detecting runt data frames received by a network switch. The arrangement includes a plurality of queuing logics, a rules queue, and a runt status circuit. The plurality of queuing logics corresponding to the number of ports contained in the network switch. The queuing logics transfer received data frames to a memory area of the network switch and update a stored value that indicates the number of data transfers required to store a prescribed portion of a particular received data frame in the memory area. The rules queue examines the stored value and determines if the particular data frame is a runt data frame that is smaller than a threshold value. The runt status circuit detects when the particular data frame has been completely transferred to the memory area, and outputs a runt indication signal specifies whether or not the particular data frame is a runt data frame. The present arrangement efficiently uses components already contained in the network switch to detect which data frames are runt data frames, and outputs a signal that specifies the status of the data frame. Accordingly, the amount of logic and time required to detect runt data frames is reduced.

Additional advantages and novel features of the present invention will be set forth in part in the description which follows, and in part will become apparent to those skilled in the art upon examination of the following, or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF ILLUSTRATIVE EMBODIMENTS

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
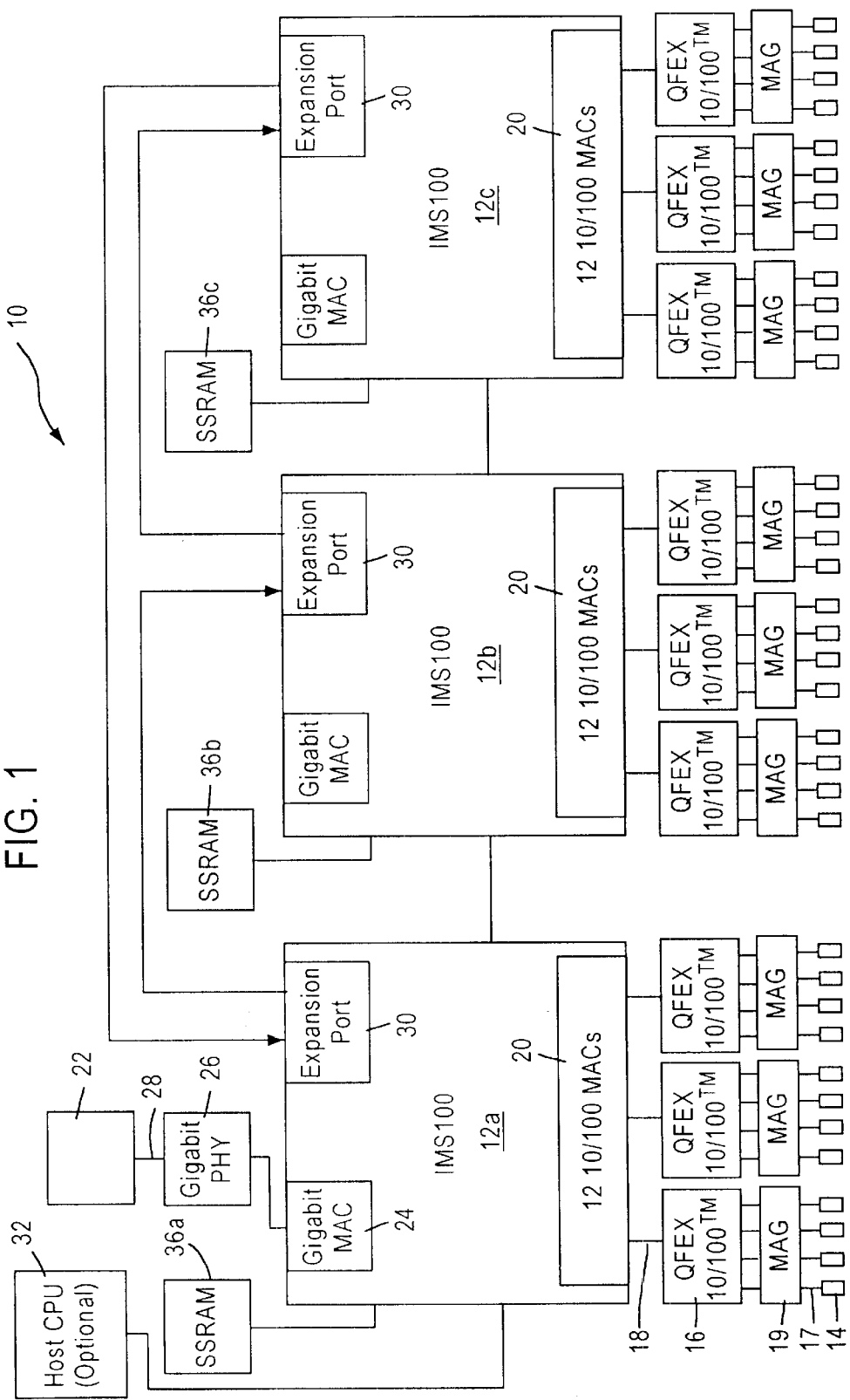
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective shared media independent interfaces (MII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished or prioritized over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding shared media independent interface (MII) 18. In particular, each 10/100 PHY transceiver 16 is configured for sending and receiving data packets between the multiport switch 12 and up to four (4) network stations 14 via the shared MII 18. A magnetic transformer 19 provides AC coupling between the PHY transceiver 16 and the corresponding network medium 17. Hence, the shared MII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. For example, each expansion port 30 can be implemented as a second gigabit MAC port similar to port 24, thereby enabling multiple multiport switches 12 to be cascaded together as a separate backbone network.

Figure 2:
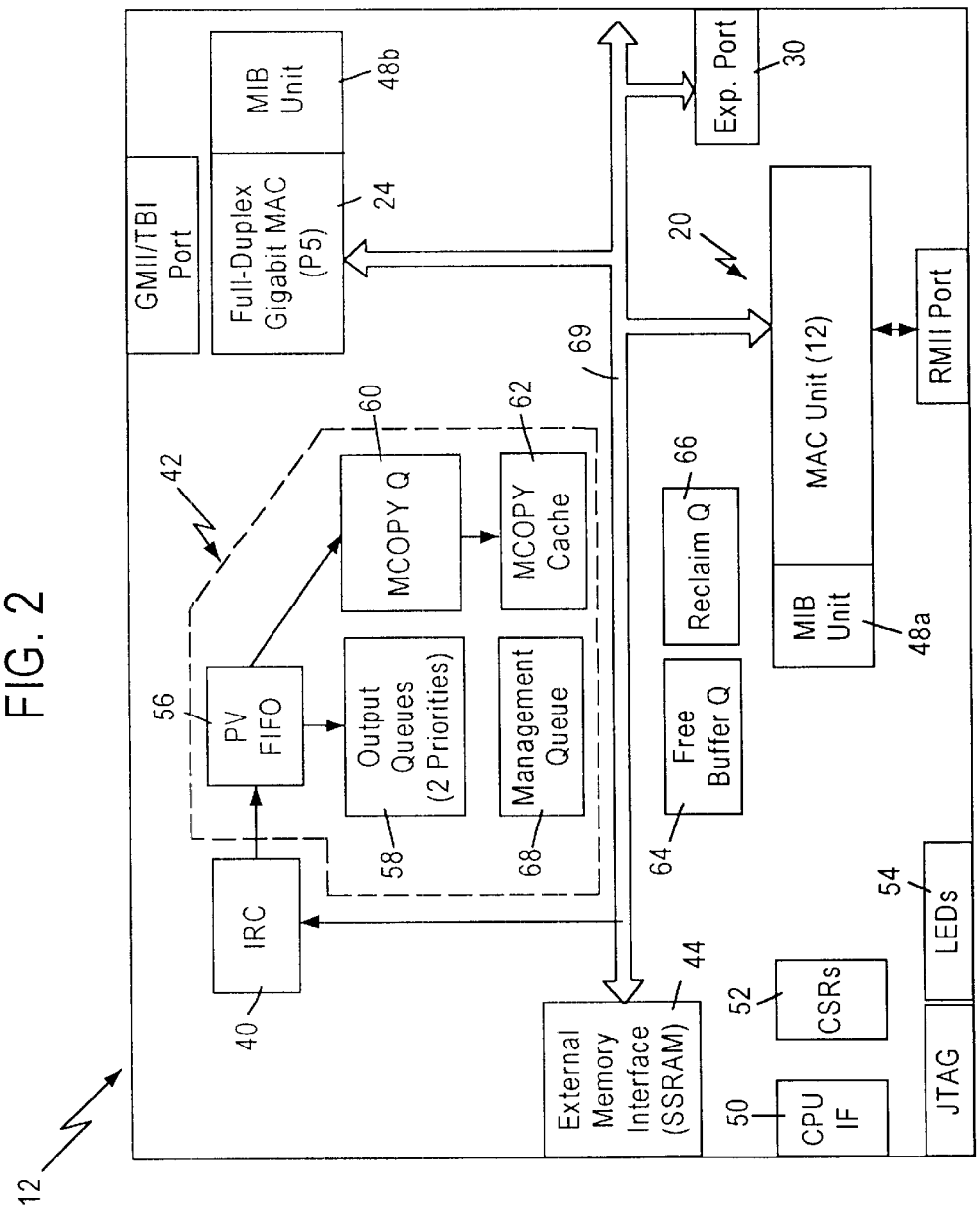
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring data frames according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received data frames, memory structures, and MIB counter information. The external memory 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received from one source to at least one destination station.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the frame pointer value and the associated header information to determine which MAC ports will output the data frame stored at the location specified by the frame pointer. The decision making engine (i.e., the IRC 40) may thus determine that a given data frame should be output by either a single port, multiple ports, or all ports (i.e., broadcast). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. Alternatively, the received data frame may include a VLAN (virtual LAN) tagged frame according to IEEE 802.1d protocol that specifies another network (e.g., via a gateway such as the gigabit mode 22) or a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should receive the data frame, Rx port number, an untagged set field, VLAN information, opcode, and frame pointer. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 fetch the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are fetched from the respective output queues 58, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to the reclaim queue 66. The reclaim queue 66 stores frame pointers that can be reclaimed by the free buffer queue 64 as free pointers. After being returned to the free buffer queue 64, the frame pointer is available for reuse by the MAC unit 20 or the gigabit MAC unit 24.

Figure 3B:
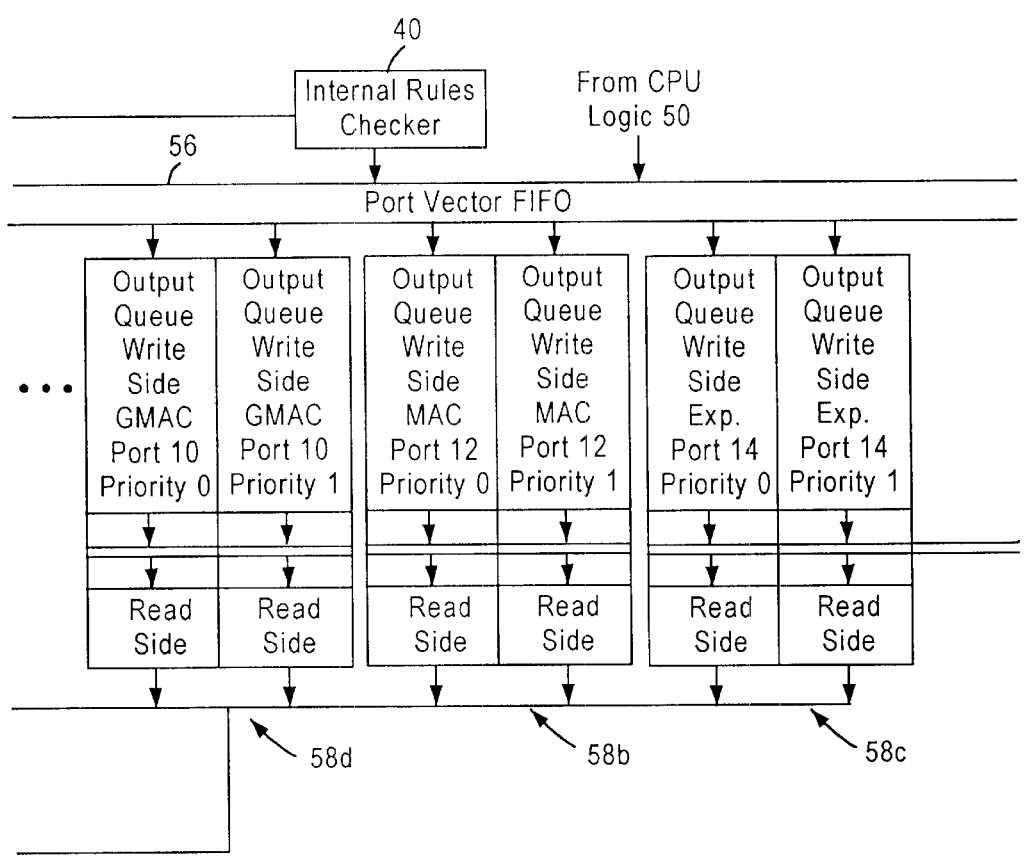
FIG. 3 is a block diagram illustrating in detail the switching subsystem of FIG. 2.
Figure 3C:
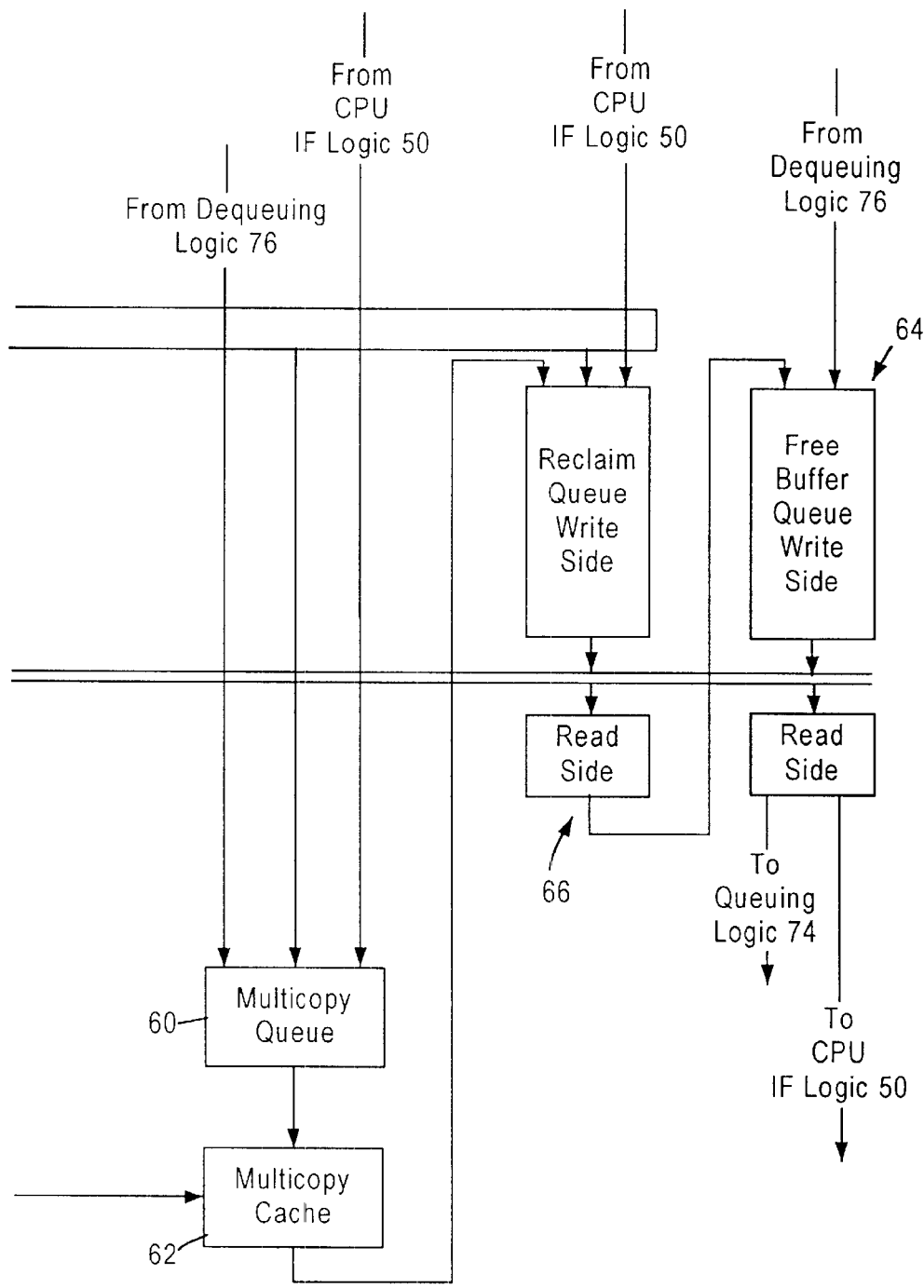

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 20b. The receive portion 20a and the transmit portion 20b each include twelve (12) MAC modules (only two of each shown and referenced by numerals 70a, 70b, 70c, and 70d) configured for performing the corresponding receive or transmit function for four (4) switch ports according to IEEE 802.3 protocol. Hence, the MAC modules 70c and 70d perform transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a data frame in an internal FIFO upon reception from the corresponding switch port. The size of the FIFO is sufficient to store the data frames that arrive between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of the data frame is then transferred over a write data bus 69a from the receive FIFO to the external memory 36 in a direct memory access (DMA) transaction during the assigned slot based on the retrieved frame pointer. The data frame is stored in the location pointed to by the free buffer pointer obtained from the free buffer pool 64, although a number of other buffers may be used to store data frames, as will be described. The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port (i.e., referring to the 10/100 Mb ports of the multiport switch 12) to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue, e.g. at least one of the output queues 58 or the management queue 68, should receive the associated frame pointer. The port vector FIFO 56 places the frame pointer into the top of the appropriate queue 58 and/or 68. This queues the transmission of the frame. Each output queue 58 is processed separately by the host CPU 32 via the CPU interface 50.

As shown in FIG. 3, each of the transmit MAC units 70c, 70d, 72d, and 72c has an associated output queue 58a, 58b, 58c, and 58d, respectively. Although not shown in FIG. 3, in preferred embodiments, each of the output queues 58 has a high priority queue for high priority frame pointers, and a low priority queue for low priority frame pointers. The high priority frame pointers are used for data frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the data frame from the external memory 36 at the memory location specified by the frame pointer. The scheduler 80 schedules the request, and issues a grant for the dequeuing logic 76 of the transmit gigabit port 24b to initiate a DMA read during the assigned slot. In response to the grant, the dequeuing logic 76 reads the data frame (along the read bus 69b) in a DMA transaction from the location in external memory 36 pointed to by the frame pointer, and stores the data frame in the internal transmit FIFO for transmission by the transmit gigabit MAC 72c. If the frame pointer specifies a unicopy transmission, the frame pointer is returned to the free buffer queue 64 following writing the data frame into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the data frame for a particular output port based on a fetched frame pointer and stores the data frame in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, an exemplary arrangement for detecting runt data frames will be described, followed by an exemplary procedure that can be performed to detect runt data frames.

Runt Status Detection

Figure 4:
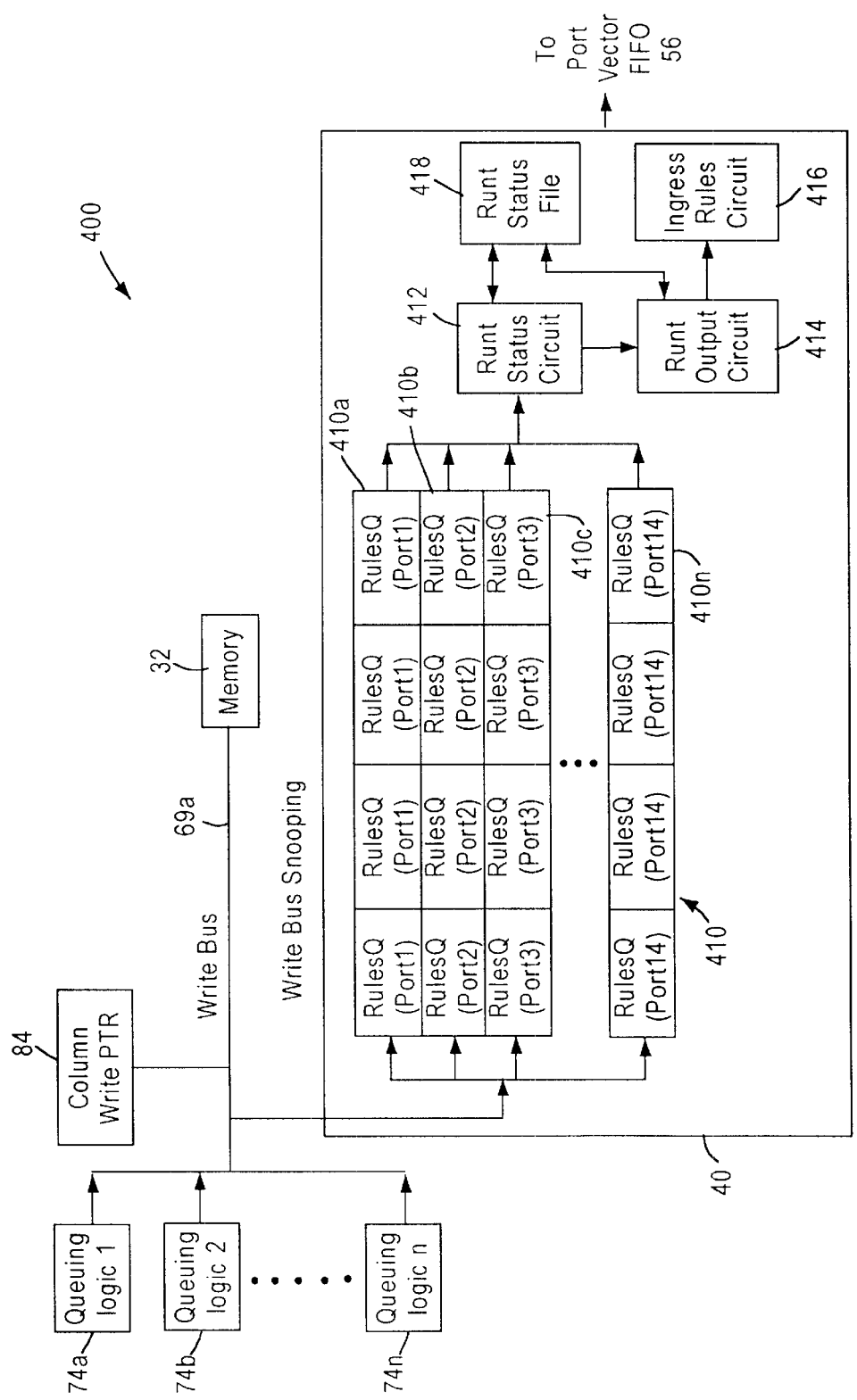
FIG. 4 is a block diagram of an arrangement for detecting runt data frames according to an exemplary embodiment of the present invention.

FIG. 4 illustrates an arrangement 400 for detecting runt data frames that are received by the multiport switch 12. As previously stated, each output port includes queuing logic 74 that is responsible for transferring data frames from the MAC receive FIFO to a memory area of the multiport switch 12, such as the external memory 36. For example, as illustrated in FIG. 4, the first queuing logic 74A corresponds to the first output port. The second queuing logic 74B corresponds to the second output port, etc. Data frames arriving at a particular output port are captured in the MAC receive FIFO. When at least 64 bytes of a data frame have been captured, the queuing logic 74 will begin transferring data to the external memory 36 during the next time slot assigned by the scheduler 80. Under certain conditions, such as, for example, when the data frame is less than 64 bytes, the queuing logic 74 will begin transferring data to the external memory 36, during the next assigned time slot, when the data frame has been completely received.

The queuing logic 74 transfers data to the external memory 36 over the write data bus 69A. Data frames received in the MAC receive FIFO are stored in at least one frame buffer within the external memory 36. When the queuing logic 74 initiates a data transfer to the external memory 36, it asserts an internal START_OF_DATA signal that alerts the IRC 40 to initiate snooping on the write data bus 69A. When the START_OF_DATA signal is detected, the rules queue 410 snoops on the write data bus 69A to capture the first 40 bytes of data that the queuing logic 74 transfers to the external memory 36.

As illustrated in FIG. 4, the IRC 40 provides a separate rules queue FIFO 410a–410n for each receive port of the multiport switch 12 (i.e., 12 output ports, expansion port 30, and gigabit port 24). Each rules queue FIFO 410a–410n is 4 entries deep, and therefore captures information pertaining to 4 received data frames. The snooping performed by the rules queue 410 captures the header information of the data frame and a portion of the data contained therein. When the data frame has been completely transferred to the external memory 36, the queuing logic 74 deasserts the START_OF_DATA signal to indicate completion of transfer of the data frame. Furthermore, the queuing logic 74 will output a status signal that indicates if the data frame was received without errors.

Figure 5A:
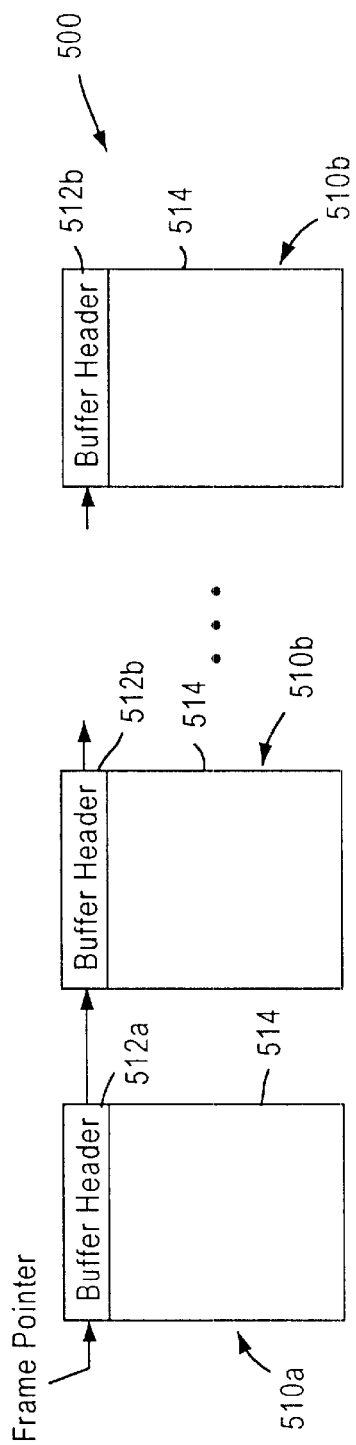
FIG. 5A illustrates a linked list data structure used to store received data frames in the external memory, according to an exemplary embodiment of the present invention.

Referring additionally to FIG. 5A, a linked list data structure 500 used to store received data frames in the external memory 36, according to an exemplary embodiment of the present invention, will be described. The linked list data structure 500 includes multiple frame buffers 510 that are linked together in order to receive various-sized data frames. The frame buffers 510 used to create the linked list 500 illustrated in FIG. 5A are 256 bytes in length, although depending on the specific implementation of the present invention, buffer lengths of different sizes may be used.

As illustrated in FIG. 5A, there are two different types of frame buffers, namely a "first" frame buffer 510A and a "subsequent" frame buffer 510B. As suggested, the first frame buffer 510A is first in the linked list data structure 500. The subsequent frame buffers 510B correspond to all other frame buffers in the linked list data structure 500. Regardless of type, each frame buffer 510 (first or subsequent) includes a header portion 512 (e.g., buffer header) and a data portion 514. The buffer header 512 is 16 bytes in length, while the data portion 514 is 240 bytes in length. The buffer header 512 of each frame buffer 510 includes information, such as a pointer, that addresses a location in the external memory 36 where a frame buffer 510 is located. Hence, the linked list data structure is composed of plural frame buffers 510 linked together by address pointers, stored in each buffer header 512, that indicate the location of the next frame buffer 512 in the external memory 36. According to the exemplary embodiment illustrated in FIG. 5A, the pointer used to address the first frame buffer is called a frame pointer. This is the identical frame pointer that is used to identify data frames by the IRC 40, control queues, and output queues.

Figure 5B:
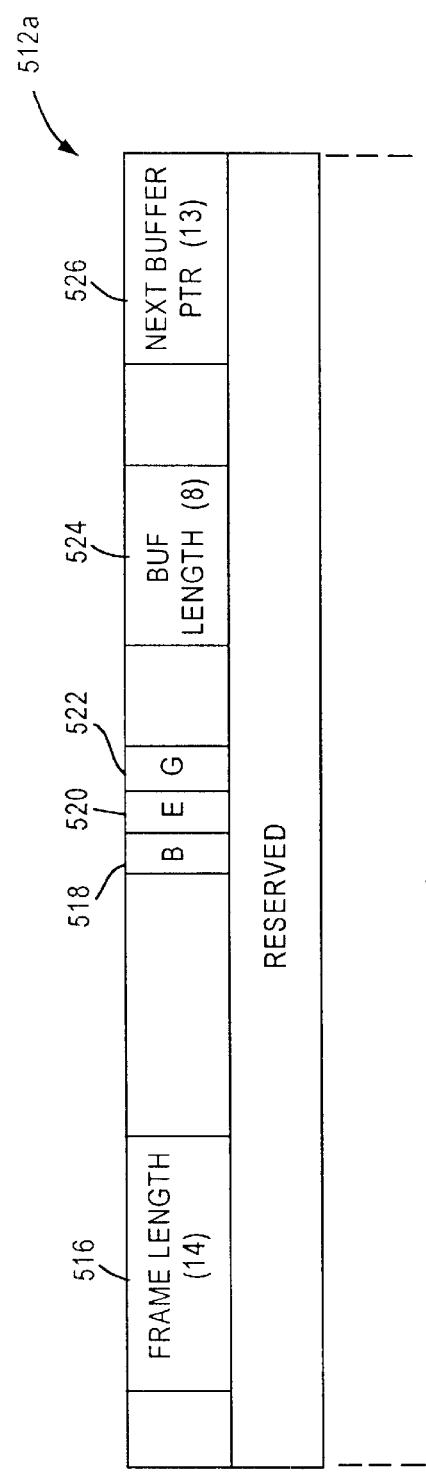
FIG. 5B is a block diagram illustrating the format of a first frame buffer header from the linked list data structure of FIG. 5A.

FIG. 5B illustrates the format of a first buffer header 512A. Each frame buffer 510 stores a next buffer pointer 526 that addresses the location, in the external memory 36, of the next frame buffer 510 in the linked list 500. The first buffer header 512A uses eight bytes to store required information, and reserves the remaining eight bytes.

As illustrated in FIG. 5B, the first buffer header 512A contains a plurality of fields. The frame length field 516 is fourteen (14) bits long and stores a value corresponding to the total size of the received data frame. The value stored in the frame length field 516 takes into account the destination address of the received data frame and the frame check sequence. A "B" bit 518 (beginning of frame marker) is used to indicate whether the current frame buffer 510 contains the beginning of the received data frame. The "B" bit 518 is set (i.e., assigned a value of "1") to indicate that the current frame buffer 510 is the first frame buffer 510A used to store the received data frame, and cleared (i.e., assigned a value of "0") for all subsequent frame buffers 510B. An "E" Bit 520 (End of Frame Marker) is used to indicate that the current frame buffer 510 is the last frame buffer used to store a received data frame. When the "E" bit 520 is set (i.e., assigned a value of "1"), there are no more frame buffers 510 in the linked list 500.

A "G" bit 522 (good frame) is used to indicate that the current data frame did not experience any receive errors. The "G" bit 522 and the "B" bit 518 are both used for diagnostic purposes. However, the dequeuing logic 74 does not check the value of the "G" bit 522. The buffer length field 524 is eight (8) bits long and stores a value that indicates the number of bytes in the data portion 514 of the current frame buffer 510, beginning with the first byte after the buffer header 512. The next buffer pointer field 526 is thirteen (13) bits long, and stores the value of the address pointer to the subsequent frame buffer 510B in the linked list 500. If the "E" bit 520 is set, however, the next buffer pointer is undefined.

Returning to FIG. 4, the IRC 40 monitors the signal output of the queuing logic 74 and places captured information, as well as the status of the data transfer, into the rules queue 410. When the queuing logic 74 outputs the END_OF_FRAME signal, the scheduler 80 enables processing of the header information by the IRC 40. Specifically, the IRC 40 performs various functions on the captured header information such as SA and DA lookups, in order to generate a forwarding descriptor. In addition, the rules queue 410 is capable of monitoring the number of entries stored in the rules queue FIFOs 410a–410n for each port of the multiport switch 12. If, during normal operation, the rules queue 410 detects that a port has three entries waiting in its corresponding FIFO (i.e., rules queue FIFOs 410a–410n), it alerts the IRC 40 so that appropriate flow control may be applied to regulate network activity for the detected port.

As illustrated in the exemplary arrangement of FIG. 4, the header information captured by the rules queue 410 is output to a runt status circuit 412. The runt status circuit 412 is responsible for generating a runt indication signal that specifies whether the data frame whose header has been captured by the rules queue 410 is a runt data frame. Additionally, the runt status circuit 412 will normally output the runt indication signal when transfer of the data frame to the external memory 36 is complete.

According to one embodiment of the present invention, the runt indication signal generated by runt status circuit 412 specifies which of the ports will transmit the data frame currently being processed. For example, if an entry from one of the rules queue FIFOs 410a–410n corresponds to the second output port (i.e., FIFO 410b), the runt status circuit 412 will output a runt indication signal that indicates that the data frame which will be received by the second output port is either a runt data frame or a normal data frame. This can be accomplished in several ways. For example, according to one specific implementation of the present invention, the runt status circuit 412 creates a runt status file 418, or array structure, that contains a plurality of cell locations. The runt status file 418 can be maintained in the external memory 36, or in a memory area located on the multiport switch 12. Placement of the runt status file 418 on the multiport switch 12 has an advantage of improving access to data stored therein. The number of cell locations is selected to correspond to the number of entries in the rules queue FIFOs 410a–410b for the ports embodied in the multiport switch 12. The runt status circuit 412 will then store a runt indication value for each entry in the rules queue FIFOs in its respective cell location within the runt status file 418.

In such an embodiment, a runt output circuit 414 can optionally be provided to address the cell locations of the runt status file 418. The runt output circuit 414 will then determine which output port corresponds to specific entries stored in cell locations of the runt status file 418. Accordingly, when data frames are processed by the IRC 40, the runt output circuit 414 provides an indication of which output port will transmit the data frame corresponding to the current header being processed. This information is output to an ingress rules circuit 416 of the IRC 40 prior to performing the SA and DA lookups. The ingress rules circuit 416 performs various tests on the header of the receive data frame in order to determine whether the data frame was received with errors.

If the runt status circuit 412 detects a runt data frame, then the IRC configuration register 52 is examined in order to determine if the internet group membership protocol (IGMP) frame capture bit is set. If the IGMP frame capture bit is set, then the ingress rules circuit 416 parses the frame header in order to determine if it is an IGMP frame. Accordingly, rather than parsing each received data frame to determine if it is an IGMP frame, the present invention only parses data frames that do not have a runt status. Additionally, depending on the specific implementation of the network, runt data frames may simply be discarded. Hence, the ability to identify specific data frames that can be relieved from IGMP parsing advantageously eliminates unnecessary processing and speeds up overall operation of the multiport switch 12.

As the queuing logic 74 transfers the data frames to the external memory 36, it updates a stored value such as, for example, the value of a column write pointer 84 that indicates the number of data transfers required to store the data frame in the external memory 36. For example, the value of the column write pointer 84 can be reset prior to initiating transfer of a data frame, or subsequent to completion of transfer. Each time the queuing logic 74 transfers a portion of the data frame along the write data bus 69A, the value of the column write pointer 84 is incremented. Accordingly, the number of transfers required to store a given data frame in the external memory 36 will vary depending on the size of the write data bus 69A (i.e., 16 bits, 32 bits, 64 bits, etc.)

The runt status circuit 412 examines the value of the column write pointer 84 in order to determine if a data frame is a runt data frame. If the value of the column write pointer 84 is greater than a prescribed value, then the runt status circuit 412 outputs a runt indication signal specifying that the data frame is not a runt data frame. Alternatively, if the value of the column write pointer 84 is less than the prescribed value, then the runt status circuit 412 will output a runt indication signal specifying that the data frame is a runt data frame. According to the exemplary embodiment of the invention, the write data bus 69A is a 64-bit bus, and the prescribed value corresponds to 8 data transfers (512 bits).

Hence, according to the enclosed embodiment, a runt data frame may be defined as a data frame that contains less than 64 bytes. However, it should be noted that various other sized data buses and data transfers can be used to define a runt data frame.

If the value of the column write pointer 84 is equal to the prescribed value (i.e., 8 data transfers) then the runt status circuit 412 can not make an accurate determination as to whether or not the data frame is a runt data frame. Since the write data bus 69A is a 64-bit bus, (i.e., 8 bytes), each transfer must contain 8 bytes of information. The information does not have to be 8 bytes of data. For example, the information can include only 1–7 bytes of actual data. In order to detect if the information transferred contains 8 bytes of data, the runt status circuit 412 determines the size of the buffer used to store the data frame. As previously indicated, the header information captured by the rules queue 410 includes the buffer length field 524 that stores the value of the total length of data stored in the frame buffer. If the size of the data portion is greater than a threshold value (e.g., 64 bytes) then the runt status circuit 412 will output a runt indication signal specifying that the data frame is not a runt data frame. If however, the size of the data portion is determined to be less than the threshold value, then the runt status circuit 412 will output a runt indication signal specifying that the data frame is a runt data frame. According to one specific implementation, the runt status circuit 412 examines the two most significant bits of the buffer length field in order to determine if the size of the data portion is equal to or greater than the threshold value. For example, if either of the two most significant bits are set then the data portion is at least equal to the threshold value, and therefore the data frame is not a runt data frame.

Figure 6:
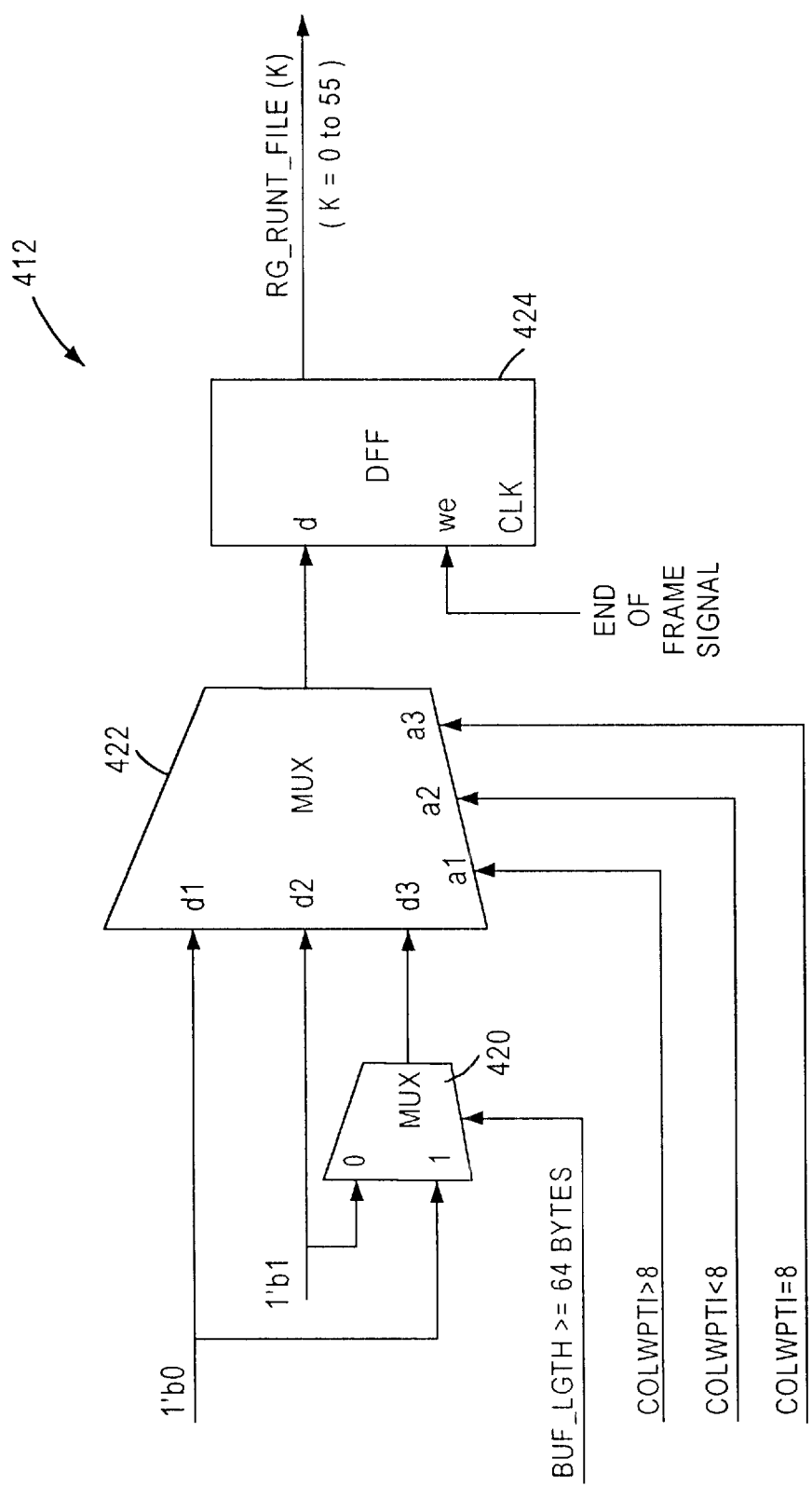
FIG. 6 is a circuit diagram illustrating a runt status circuit according to an exemplary embodiment of the present invention.

FIG. 6 is a circuit diagram illustrating an exemplary runt status circuit 412 in accordance with an embodiment of the present invention. The exemplary runt status circuit 412 includes multiplexer 420, multiplexer 422, and register 424. Multiplexer 420 receives a logic one (1) value in its I0 input and a logic zero (0) value in its I1 input. The output of multiplexer 420 is controlled by the size of the data frame. Specifically, the threshold value (i.e., 64 bytes) is used to control multiplexer 420. For example, if the data frame is 64 bytes or greater, then it is not a runt data frame and multiplexer 420 will be switched to output a logic zero (0) signal (i.e., input I1).

Multiplexer 422 receives a logic zero (0) at input D1, a logic 1 at input D2, and the output of multiplexer 420 at input D3. The output of multiplexer 422 is controlled by the value of the column write pointer 84 via the three switches S1, S2, and S3. For example, if the value of the column write pointer 84 is greater than the prescribed value (i.e., greats than 8 transfers) then the data frame is not a runt data frame, and switch SI will cause multiplexer 422 to output the signal received at input D1 (i.e., logic zero). If the value of the column write pointer 84 is less than 8, then the data frame is a runt data frame and switch S2 will cause multiplexer 422 to output the signal received at input D2 (i.e., logic one). As previously stated, if the value of the column write pointer 84 is equal to the prescribed value, then the status of the data frame can be determined based on its total size. Accordingly, if the value of column write pointer 84 is equal to 8, then switch S3 will cause multiplexer 422 to output the signal being received at input D3. The signal received at input D3 corresponds to the output of multiplexer 420, and indicates whether the size of the received amount of data stored in the frame buffer is greater than or equal to the threshold value (i.e., 64 bytes).

The output of multiplexer 422 indicates whether the data frame is a runt data frame. For example, if the output of multiplexer 422 is a logic zero, then the data frame is not a runt data frame. Similarly, if the output of multiplexer 422 is a logic one, then the data frame is a runt data frame. The output of multiplexer 422 is input to register 424. Register 424 is clocked by a signal, such as an END_OF_FRAME signal, that indicates whether the queuing logic 74 has completed transfer of the data frame to the external memory 36. Accordingly, register 424 will only output the runt indication signal when the queuing logic 74 has completed transfer of the data frame. As previously indicated, the runt indication signal may be stored in the form of a runt indication status within a runt status file 418 having a plurality of entries. According to the disclosed embodiment, the number of entries within the runt status file 418 is fifty-six (56), corresponding to four entries for each rules queue FIFO 410a–410n of the 14 ports (e.g., 12 output ports, expansion port, and gigabit port) of the multiport switch 12.

Figure 7:
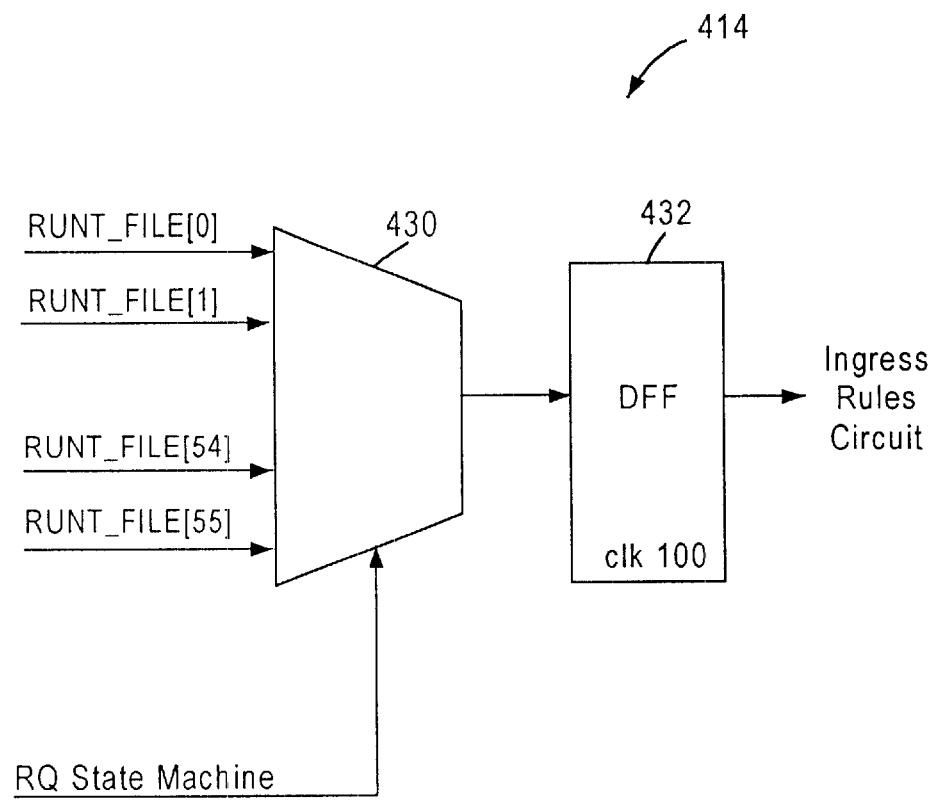
FIG. 7 is a circuit diagram illustrating a runt output circuit according to an exemplary embodiment of the present invention.

FIG. 7 illustrates an exemplary runt output circuit 414 according to an embodiment of the present invention. The runt output circuit 414 includes multiplexer 430 and register 432. Multiplexer 430 contains a number of entries that correspond to the number of cell locations within the runt status file 418 (i.e., 56). The output of multiplexer 430 is controlled by a rules queue state machine (not shown) that indexes the locations in which register 424 stores the runt indication values. The rules queue state machine therefore selects which entry in the runt status file 418 will be output by multiplexer 420. The output of multiplexer 430 is input to register 432. Register 432 is clocked by a local clock such as, for example, the system clock, in order to output the status of the data frame to the ingress rules circuit 416. As previously stated, this information allows the ingress rules circuit 416 to determine whether an IGMP type check will be performed on the data frame.

Figure 8:
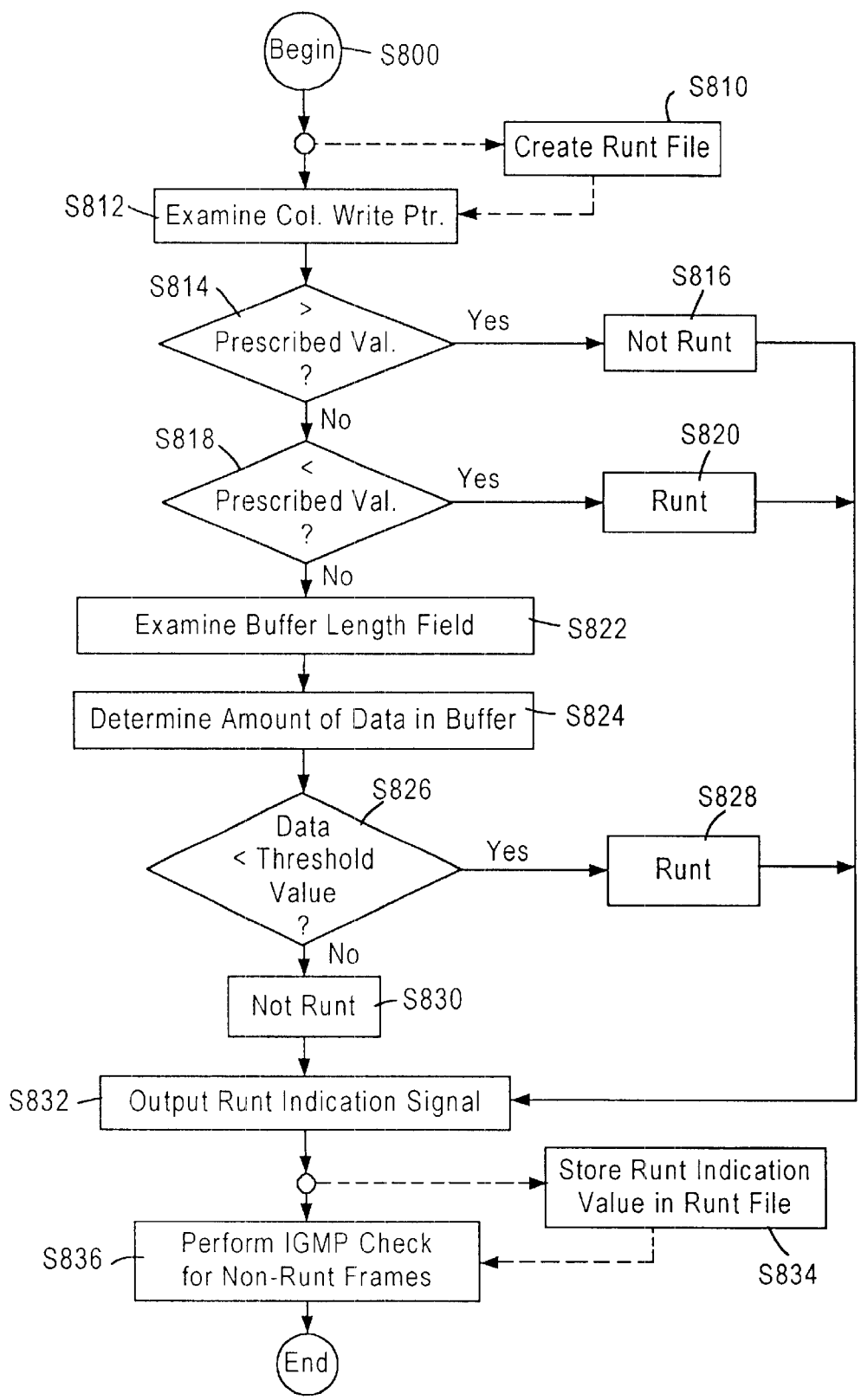
FIG. 8 is a flow chart illustrating the steps performed to detect data frames according to an exemplary embodiment of the present invention.

FIG. 8 is a flowchart illustrating the steps performed to detect runt data frames according to an exemplary embodiment of the present invention. The procedure begins at step S800, corresponding to a point in time after the multiport switch 12 has been initialized, but before any data frames have been received. When data frames are received by the various MAC FIFOs, the queuing logics 74 begin transferring data to the external memory 36. The rules queue 410 also begins snooping on the write data bus 69A in order to capture the header information for the data frames being transferred to external memory 36. As previously indicated, it is possible to indicate whether a received data frame is a runt data frame by outputting a signal indicating such a status, or storing values corresponding to the status of data frames for each of the output ports within a runt status file 418. Accordingly, at step S810, a runt status file 418 is created if the status of data frames from each of the ports will be monitored. Once the file has been created, control passes to step S812. Alternatively, if a runt status file 418 will not be created, then control passes directly to step S812 after initialization of the multiport switch 12.

At step S812, the runt status circuit 412 examines the value of the column write pointer 84 to determine how many write transfers were required to store the data frame in the external memory 36. At step S814, the size of the column write pointer 84 is compared to a prescribed value (e.g., 8 data transfers). If the value of the column write pointer 84 is greater than the prescribed value, then the data frame is not a runt data frame and control passes to step S816 where it is identified as such. If the value of the column write pointer 84 is not greater than (i.e., less than or equal to) the prescribed value, then control passes to step S818. At step S818, it is determined if the value of the column write pointer 84 is less than the prescribed value. If the value of the column write pointer 84 is less than the prescribed value, then control passes to step S820 where the data frame is identified as a runt data frame. Otherwise, the value of the column write pointer 84 is equal to the prescribed value, and the length of the data portion of the frame buffer must also be examined in order to determine if the received data frame is a runt data frame.

Control passes to step S822 where the buffer length field is examined. As previously stated, the buffer length field in contained in the header of the frame buffer used to store the received data frame in the external memory 36. When the rules queue 410 snooped on the write data bus 69A during the transfer of the data frame to the external memory 36 to capture the header information of the data frame, the buffer length field was also captured. The runt status circuit 412 examines the value stored in the buffer length field in order to determine the amount of data stored in the frame buffer at step S824. At step S826, the runt status circuit 412 determines if the amount of data stored in the frame buffer is less than the threshold value (e.g., 64 bytes). If the amount of data is less than the threshold value, then the data frame is a runt data frame and identified as such at step S828. Otherwise, the data frame is not a runt data frame and identified as such at step S830.

At step S832, the runt status circuit 412 outputs a runt indication signal. As previously stated, the runt indication signal may be in the form of an asserted signal, or a value that indicates whether the data frame is a runt data frame. If a runt status file 418 was created at step S810, then control will proceed to step S834 where the runt indication value will be stored in the runt data file. The frame header will then be forwarded to the ingress rules circuit 416, together with an indication as to whether or not the data frame is a runt data frame. The ingress rules circuit 416 performs various functions on the frame pointer including an IGMP type check for normal data frames, as indicated by step S836. As previously stated, the ingress rules checker 416 uses the runt status in order to identify which data frames require an IGMP type check. Therefore, if a data frame is a runt data frame, then the ingress rules circuit 416 will not perform step S836.

The present invention provides an efficient arrangement for detecting runt data frames received by the multiport switch. Rather than providing runt detection logic for each port of the multiport switch, the present arrangement advantageously provides a rules queue capable of snooping on the write data bus to capture sufficient information for identifying runt data frames. In addition, the present arrangement simplifies the amount of testing required to detect a runt data frame by first examining the value of a column write pointer. Additional tests are only performed when the value of the column write pointer produces an indeterminate response. Such a system compensates for possible errors (e.g., transmission of 128 bytes of erroneous data) that can occur, hence improving robustness of the logic.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of detecting whether data frames received by a network switch that selectively forwards received data frames to ports of the switch for transmission are runt data frames that are smaller than a threshold value, the method comprising the steps:

examining a stored value that indicates the number of data transfers to a memory area required to store a prescribed portion of the received data frame in the memory area;

determining if the received data frame is a runt data frame based on the stored value; and generating a runt indication signal upon completion of transfer of the received data frame to the memory area, the runt indication signal specifying whether the received data frame is a runt data frame.

2. A method of detecting whether data frames received by a network switch that selectively forwards received data frames to ports of the switch for transmission are runt data frames that are smaller than a threshold value, the method comprising the steps:

examining a stored value that indicates the number of data transfers to a memory area required to store a prescribed portion of the received data frame in the memory area;

determining if the received data frame is a runt data frame based on the stored value; and generating a runt indication signal upon completion of transfer of the received data frame to the memory area, the runt indication signal specifying whether the received data frame is a runt data frame;

wherein the step of generating a runt indication signal further includes a step of specifying which of the switch ports will transmit the data frame.

3. The method of claim 1, further comprising the steps:

creating a runt status file having a plurality of addressable cell locations; and storing runt indication values for each of the ports in respective cell locations of the runt status file.

4. The method of claim 1, further comprising the steps:

performing an internet group membership protocol (IGMP) type check on the received data frame if the received data frame is not a runt data frame; and not performing an IGMP type check on the received data frame if the received data frame is a runt data frame.

5. The method of claim 1, wherein the step of determining if the received data frame is a runt data frame includes a step of comparing the stored value to a prescribed value.

6. The method of claim 1, wherein the runt indication signal, generated when the stored value is greater than a prescribed value, specifies that the received data frame is not a runt data frame.

7. The method of claim 1, wherein the runt indication signal, generated when the stored value is less than a prescribed value, specifies that the received data frame is a runt data frame.

8. The method of claim 1, wherein when the value of the column write pointer is equal to a prescribed value, the method further comprising the steps:

determining the amount of data contained in a buffer used to store the prescribed portion of the received data frame in the memory area; and performing the step of determining if the received data frame is a runt data frame based on both the stored value and the amount of data contained in the buffer used to store the prescribed portion of the received data frame.

9. The method of claim 8, further comprising, prior to performing the step of examining the stored value, performing the steps:

snooping on a data bus used to transfer the received data frame from a queuing logic of the network switch to the memory area; and capturing a portion of a header of the received data frame as it is being transferred from the queuing logic to the memory area.

10. The method of claim 9, further comprising the steps:
examining the value of a buffer length field contained in the captured portion of the header of the received data frame, the buffer length field storing a value that indicates the amount of data stored in the buffer; and
determining if the buffer contains a prescribed amount of data, based on the buffer length field.

11. The method of claim 10, wherein the step of examining the value of a buffer length field comprises the step of examining the value of the two most significant bits of the buffer length field to determine whether the prescribed amount of data is greater than or equal to the threshold value.

12. The method of claim 10, wherein:
the step of determining if the buffer contains a prescribed amount of data comprises a step of determining if the prescribed amount of data is less than the threshold value; and
the step of generating a runt indication signal includes the steps:
generating a runt indication signal specifying that the received data frame is a runt data frame if the prescribed amount of data is less than the threshold value, and
generating a runt indication signal specifying that the received data frame is not a runt data frame if the prescribed amount of data is greater than or equal to the threshold value.

13. An arrangement for detecting runt data frames received by a network switch that forwards received data frames to multiple ports comprising:
a plurality of queuing logics, corresponding to the number of said multiple ports for transferring received data frames to a memory area of the network switch and updating a stored value that indicates the number of data transfers required to store a prescribed portion of a particular received data frame in said memory area;
a rules queue for examining said stored value and determining if said particular data frame is a runt data frame that is smaller than a threshold value; and
a runt status circuit for generating a runt indication signal specifying whether said particular data frame is a runt data frame, based upon the stored value and the threshold value.

14. An arrangement for detecting runt data frames received by a network switch that forwards received data frames to multiple ports comprising:
a plurality of queuing logics, corresponding to the number of said multiple ports for transferring received data frames to a memory area of the network switch and updating a stored value that indicates the number of data transfers required to store a prescribed portion of a particular received data frame in said memory area;
a rules queue for examining said stored value and determining if said particular data frame is a runt data frame that is smaller than a threshold value; and
a runt status circuit for generating a runt indication signal specifying whether said particular data frame is a runt data frame, based upon the stored value and the threshold value;
wherein said runt status circuit is configured to generate a runt indication signal that specifies which of the ports will transmit said particular data frame.

15. The arrangement of claim 13, further comprising a runt output circuit and wherein said runt status circuit is configured to:
create a runt status file containing a plurality of cell locations, said cell locations being addressable by said runt output circuit; and
store a runt indication value for each of the ports in a respective cell location of said runt status file.

16. The arrangement of claim 13, further comprising an internal rules checker for performing an (IGMP) type check on said particular data frame if said particular data frame is not a runt data frame.

17. The arrangement of claim 13, wherein said stored value is the value of a column write pointer.

18. The arrangement of claim 13, wherein said runt status circuit includes logic for detecting completion of transfer of said particular data frame to said memory area.

19. The arrangement of claim 13, wherein said rules queue is configured to determine if said particular data frame is a runt data frame by comparing the value of said column write pointer to a prescribed value.

20. The arrangement of claim 19, wherein:
said stored value is greater than said prescribed value; and
said runt status circuit outputs a runt indication signal specifying that said particular data frame is not a runt data frame.

21. The arrangement of claim 19, wherein:
said stored value is less than said prescribed value; and
said runt status circuit generates a runt indication signal specifying that said particular data frame is a runt data frame.

22. The arrangement of claim 19, wherein:
the value of said stored value is equal to said prescribed value; and
said rules queue is configured to determine the size of a buffer used to store the prescribed portion of said particular data frame in said memory area, and determine if said particular data frame is a runt data frame based on said stored value and the size of said buffer.

23. The arrangement of claim 22, wherein said rules queue is further configured to snoop on a data bus used for transferring said particular data frame to said memory area and capture a portion of said particular data frame during transfer from one of said plurality of queuing logics to said memory area.

24. The arrangement of claim 23, wherein said rules queue is further configured to:
examine the value of a buffer length field contained in the captured portion of said particular data frame; and
determine if the size of a data portion of said buffer is less than said threshold value.

25. The arrangement of claim 24, wherein said threshold value is 64 bytes.

26. The arrangement of claim 24, wherein said rules queue is configured to determine if the size of said data portion is less than said threshold value by examining the two most significant bits of said buffer length field.

27. The arrangement of claim 26, wherein said runt status circuit is configured to output a runt indication signal specifying that said particular data frame is a runt if the size of said data portion is less than said threshold value, and output a runt indication signal specifying that said particular data frame is not a runt if the size of said data portion is greater than or equal to said threshold value.

* * * * *

UNITED STATES PATENT AND TRADEMARK OFFICE
CERTIFICATE OF CORRECTION

| | | |
|---|---|---|
| PATENT NO. | : 6,463,478 B1 | Page 1 of 1 |
| DATED | : October 8, 2002 | |
| INVENTOR(S) | : Michael Vengchong Lau et al. | |

It is certified that error appears in the above-identified patent and that said Letters Patent is hereby corrected as shown below:

<u>Title page,</u>
Item [75], Inventors, change the second inventor's name from "Charlie Sang" to
-- Jinqlih Sang --.

Signed and Sealed this

Eighteenth Day of February, 2003

JAMES E. ROGAN
*Director of the United States Patent and Trademark Office*